(12) United States Patent
Fan et al.

(10) Patent No.: US 7,261,383 B2
(45) Date of Patent: Aug. 28, 2007

(54) COMPUTER ENCLOSURE WITH LATCH DEVICE

(75) Inventors: Chen-Lu Fan, Tu-chen (TW); Li-Ping Chen, Tu-chen (TW); Kuo-Chih Lin, Tu-Chen (TW)

(73) Assignee: Hon Hai Precision Ind. Co., Ltd, Taipei Hsien (TW)

( * ) Notice: Subject to any disclaimer, the term of this patent is extended or adjusted under 35 U.S.C. 154(b) by 211 days.

(21) Appl. No.: 10/902,908

(22) Filed: Jul. 29, 2004

(65) Prior Publication Data

US 2005/0023943 A1    Feb. 3, 2005

(30) Foreign Application Priority Data

Jul. 29, 2003    (CN)    .................................. 03268234

(51) Int. Cl.
*A47B 81/00*    (2006.01)
(52) U.S. Cl. ..................... 312/223.2; 292/80; 292/303; 292/DIG. 11
(58) Field of Classification Search ............. 312/257.1, 312/265.5, 265.3, 223.1, 223.2; 292/83, 292/124, 127, 227, 80, 81, 87, 300, 302, 292/303, DIG. 11
See application file for complete search history.

(56) References Cited

U.S. PATENT DOCUMENTS

| | | | | |
|---|---|---|---|---|
| 3,953,094 A | * | 4/1976 | Brown, Jr. .................. | 312/303 |
| 5,465,191 A | * | 11/1995 | Nomura et al. ............. | 361/681 |
| 5,751,545 A | * | 5/1998 | Jung ........................... | 361/683 |
| 5,820,235 A | * | 10/1998 | Tsai .......................... | 312/223.2 |
| 6,359,778 B1 | * | 3/2002 | Wu ............................. | 361/685 |
| 6,373,692 B1 | * | 4/2002 | Cheng ........................ | 361/683 |
| 6,398,325 B1 | * | 6/2002 | Chen et al. ............... | 312/223.2 |
| 2003/0048600 A1 | * | 3/2003 | Hsu et al. ................... | 361/683 |

FOREIGN PATENT DOCUMENTS

| | | |
|---|---|---|
| TW | 386613 | 4/2000 |
| TW | 438213 | 5/2001 |

\* cited by examiner

*Primary Examiner*—James O. Hansen
*Assistant Examiner*—Philip Gabler
(74) *Attorney, Agent, or Firm*—Wei Te Chung

(57) ABSTRACT

A computer enclosure includes a cage (10), a side panel (20) and a latch device (30) for securing the side panel to the cage. The latch device includes a cap (50) attached to the side panel, an actuator (40), a resilient strip (60), and a coil spring (48). The cap includes an end plate (56) having an aperture (562) and a base (52) defining a pair of grooves (524). The actuator includes a shaft (462) fixing the coil spring therearound and extending through the aperture, and a pair of symmetric clamps (422). The resilient strip includes a free portion (64), with a projection (642) extending therefrom. The strip is attached to the base. The actuator is slidably received in the cap and the clamps slide in the grooves to engage with free portion of the strip. The projection moves upwardly and downwardly to engage with and disengage from the cage.

20 Claims, 6 Drawing Sheets

COMPUTER ENCLOSURE WITH LATCH DEVICE

BACKGROUND OF THE INVENTION

1. Field of the Invention

The present invention relates to a computer enclosure, and in particular to a computer enclosure having a latch device for readily securing a side panel to the computer enclosure and detaching the side panel therefrom. The invention relates to contemporarily filed copending applications titled "COMPUTER ENCLOSURE WITH FASTENING DEVICE" with a Ser. No. 10/898,064 and "COMPUTER ENCLOSURE INCORPORATING HOOD FASTENER" with a Ser. No. 10/899,605.

2. Related Art

Many different means are used to secure side panels to computer enclosures. One conventional means is to simply screw a side panel directly to a computer enclosure. However, this requires a screwdriver. Installation and removal of the side panel is unduly cumbersome and time-consuming.

As computers have proliferated and improved, various latch means have been developed to facilitate installation and removal of side panels. One means of latching is shown in Taiwan Patent Application No. 87213422. Locking means thereof comprises a plurality of hooks inwardly formed from a flange of one side of a side panel of a computer casing, for engaging in corresponding slots defined in a rear panel of the computer casing. An opposite side of the side panel forms an L-shaped flange. A plurality of apertures is defined in the L-shaped flange, for extension of screws thereinto. Because screws are needed to fix the side panel to the computer casing, installation and removal of the side panel is still unduly cumbersome and time-consuming.

An improved latch device for securing a side panel to a computer enclosure which overcomes the above-mentioned problems is desired.

SUMMARY OF THE INVENTION

Accordingly, an object of the present invention is to provide a computer enclosure having a latch device for readily securing a side panel to the computer enclosure and readily detaching the side panel therefrom.

To achieve the above-mentioned object, a computer enclosure of the present invention includes a cage, a side panel and a latch device for securing the side panel to the cage. The latch device includes a cap attached to the side panel, an actuator, a resilient strip, and a coil spring. The cap includes an end plate having an aperture and a base defining a pair of grooves. The actuator includes a shaft fixing the coil spring therearound and extending through the aperture, and a pair of opposite clamps. The resilient strip includes a free portion, with a projection extending from the free portion. The resilient strip is attached to the base. The actuator is slidably received in the cap and the clamps slide in the grooves to engage with free portion of the strip. The projection moves upwardly and downwardly to engage with and disengage from the cage.

Other objects, advantages and novel features of the present invention will be drawn from the following detailed description of a preferred embodiment of the present invention with attached drawings, in which:

DESCRIPTION OF THE PREFERRED EMBODIMENT

Figure 1:
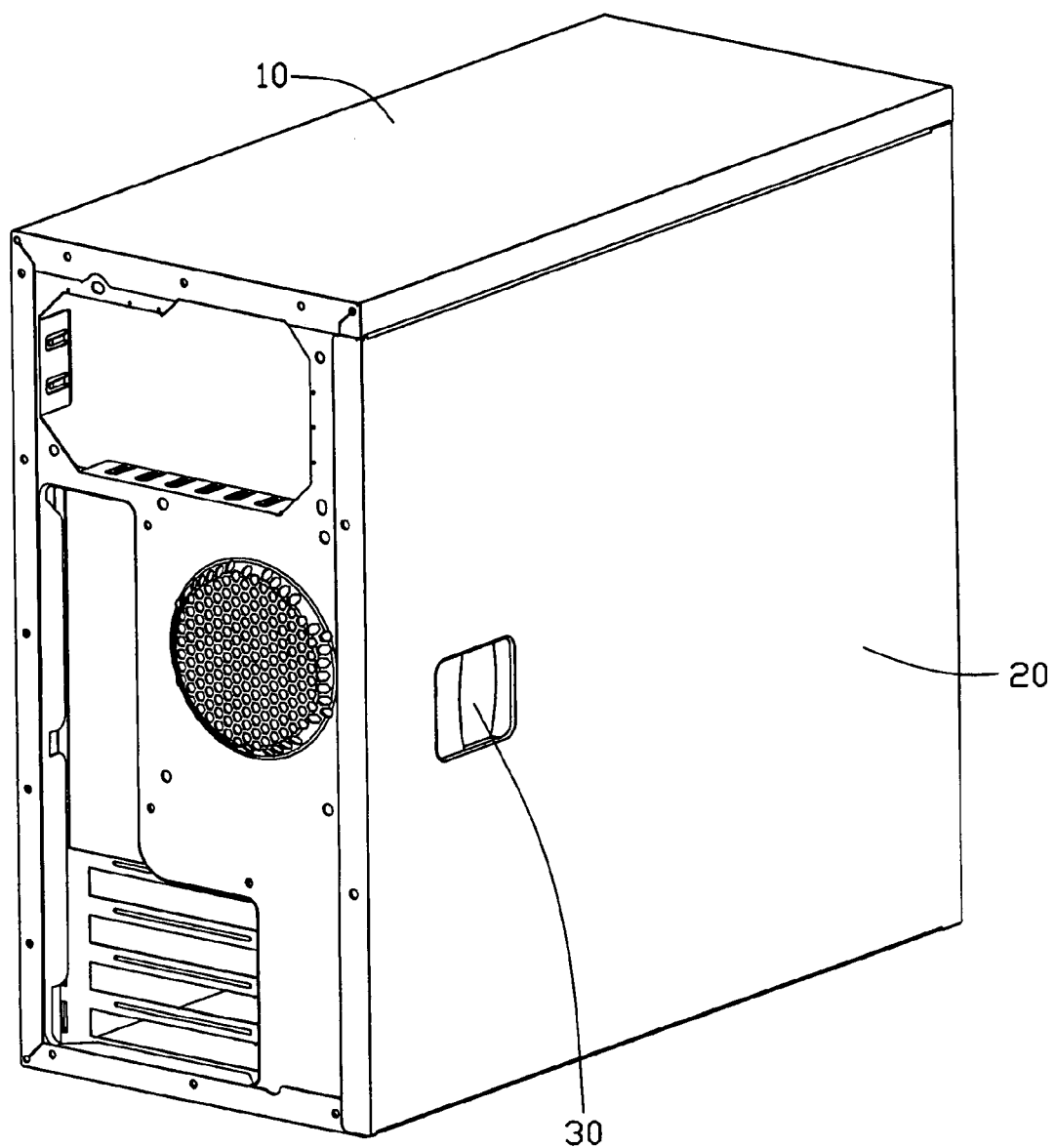
FIG. 1 is an isometric view of a computer enclosure of the present invention, the computer enclosure comprising a side panel and a latch device.
Figure 3:
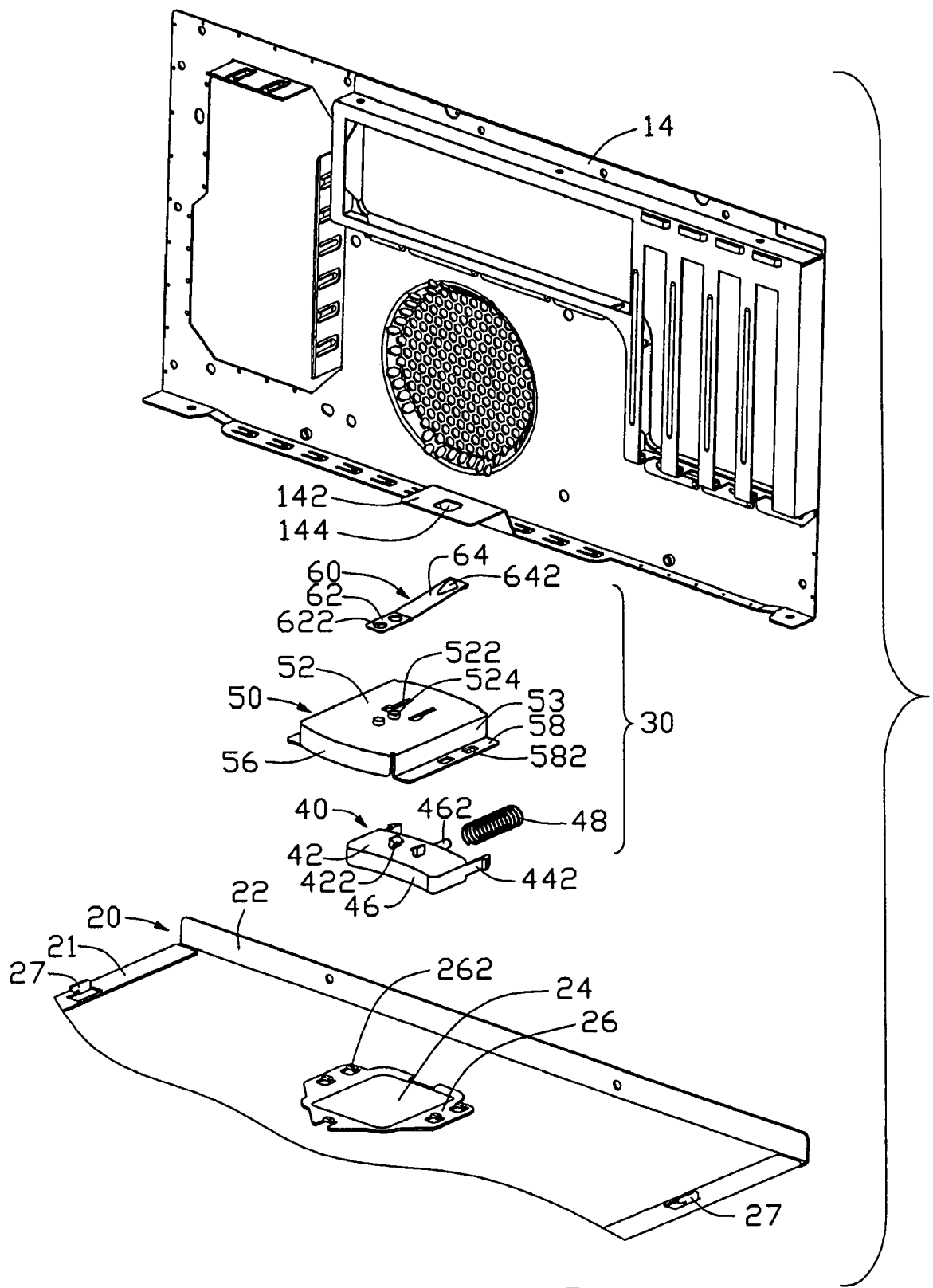
FIG. 3 is an exploded, isometric view of a rear panel, the latch device and part of the side panel of the computer enclosure of FIG. 2, but showing these components inverted.

Referring to FIGS. 1 and 3, a computer enclosure of the present invention comprises a cage 10, a side panel 20, and a latch device 30. The side panel 20 is attached to the cage 10 via the latch device 30. The latch device 30 comprises a cap 50, an actuator 40, a coil spring 48, and a resilient strip 60.

Figure 2:
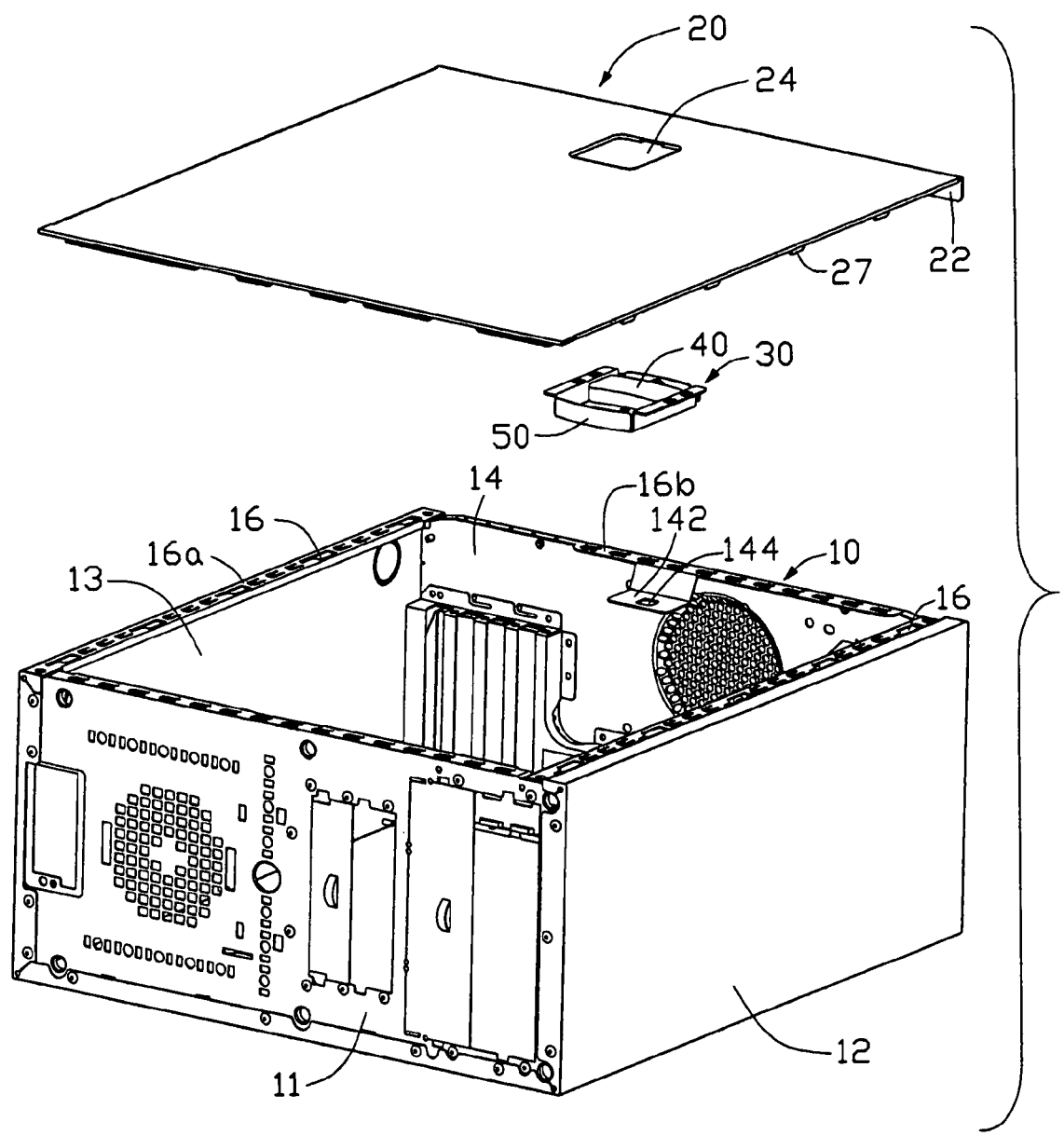
FIG. 2 is an exploded, isometric view of the computer enclosure of FIG. 1, but viewed from another aspect.

Referring also to FIG. 2, the cage 10 comprises a bottom panel 13, a top panel 12, a front panel 11, and a rear panel 14, all of which cooperatively define a cavity therebetween. A pair of flanges 16a extends toward each other from the bottom panel 13 and the top panel 12, respectively. A pair of flanges 16b extends toward each other from the front panel 11 and the rear panel 14, respectively. A plurality of slits 16 is defined in each flange 16a. A generally L-shaped bracket 142 is formed inwardly from an edge of the flange 16b of the rear panel 14. A through hole 144 is defined in the bracket 142.

The side panel 20 comprises a pair of opposite folded rims 21 corresponding to the flanges 16a of the cage 10, and a perpendicular rim 22 corresponding to the flange 16b of the rear panel 14 of the cage 10. A plurality of catches 27 extends perpendicularly from each folded rim 21, for engaging in the corresponding slits 16 of the flanges 16a of the cage 10. An opening 24 is defined in the side panel 20, the opening 24 being spaced a predetermined distance from the rim 22. A planar folded hem 26 is formed on an inner face of the side panel 20 around the opening 24. A plurality of hooks 262 extends perpendicularly from the folded hem 26 at opposite sides of the opening 24.

The cap 50 comprises a base 52, and a pair of opposite side plates 53 and a pair of opposite end plates 56 extending upwardly from the base 52. A pair of wings 58 extends perpendicularly in opposite directions from distal edges of the side plates 53 respectively. A pair of spaced slots 582 is defined in each wing 58, for engagingly retaining corresponding hooks 262 of the side panel 20. A through aperture 562 (see FIG. 4) is defined in one of the end plates 56. A pair of symmetric L-shaped grooves 522 is defined in a middle portion of the base 52, the grooves 522 being generally parallel to the side plates 53. A pair of pins 524 extends from an outer face of the middle portion of the base 52, near the grooves 522. The pins 524 define a line therebetween that is parallel to the side plates 53.

The actuator 40 is generally a hollow parallelepiped body with one open face. The actuator 40 comprises a concave end wall 46, an inmost wall 42, a pair of clasps 442 extending from opposite side walls, and a shaft 462 extending from a middle of an inside face of the concave end wall 46. A pair of symmetric clamps 422 extends from an outside face of the inmost wall 42 of the actuator 40, corresponding to the grooves 522 of the cap 50. An outer surface of the concave end wall 46 is roughened, to facilitate manual operation of the actuator 40.

The resilient strip 60 comprises a fixing portion 62, and a free portion 64 extending obliquely inwardly from the fixing portion 62. A pair of fixing holes 622 is defined in the fixing portion 62, corresponding to the pins 524 of the cap 50. A projection 642 is punched inwardly from a distal end of the free portion 64.

Figure 4:
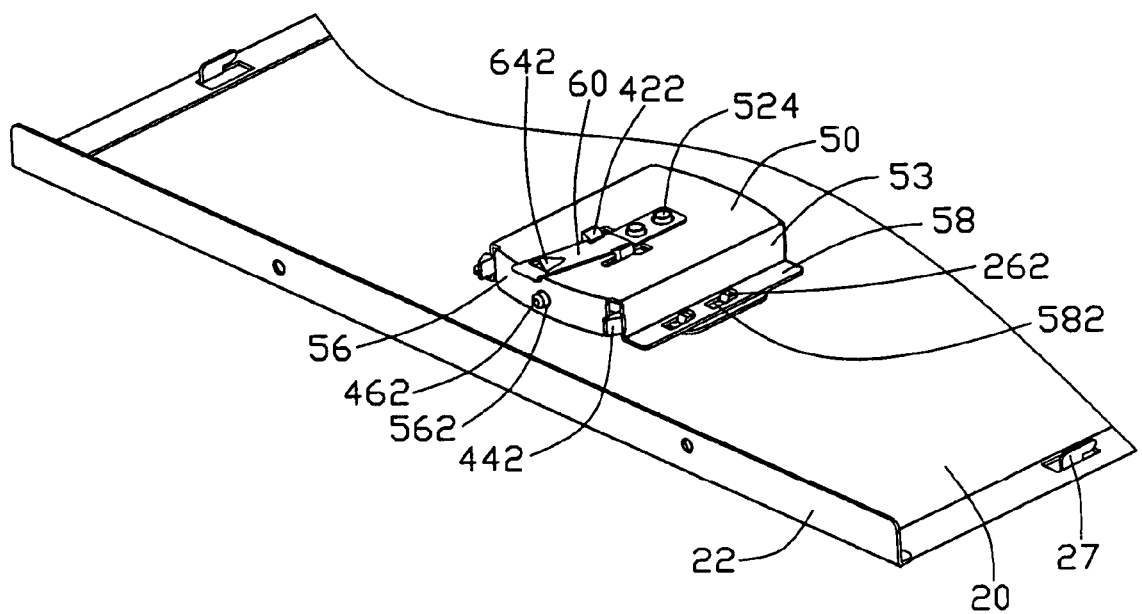
FIG. 4 is an assembled view of the latch device and the part of the side panel of FIG. 3, but viewed from another aspect.

Referring also to FIG. 4, in assembly of the latch device 30, the resilient strip 60 is attached to the base 52 of the cap 50. The pins 524 of the cap 50 are rivetingly retained in the fixing holes 622 of the resilient strip 60. The coil spring 48 is placed around the shaft 462 of the actuator 46. The actuator 40 is slidably disposed in the cap 50, with the shaft 462 extending through the aperture 562 of the end plate 56. The coil spring 48 is thus slightly compressed between the concave end wall 46 and the end plate 56 having the aperture 562. The clamps 422 are extended through the grooves 522 so that they slidably engage with the free portion 64 of the resilient strip 60. The coil spring 48 biases the clasps 442 against rear ends of the side plates 53. Thus the clamps 422 are engaged with a front end of the free portion 64 of the resilient strip 60 adjacent the fixing portion 62. Then the duly assembled latch device 30 is attached to the side panel 20. The hooks 262 of the side panel 20 are engaged in the slots 582 of the cap 50.

Figure 5:
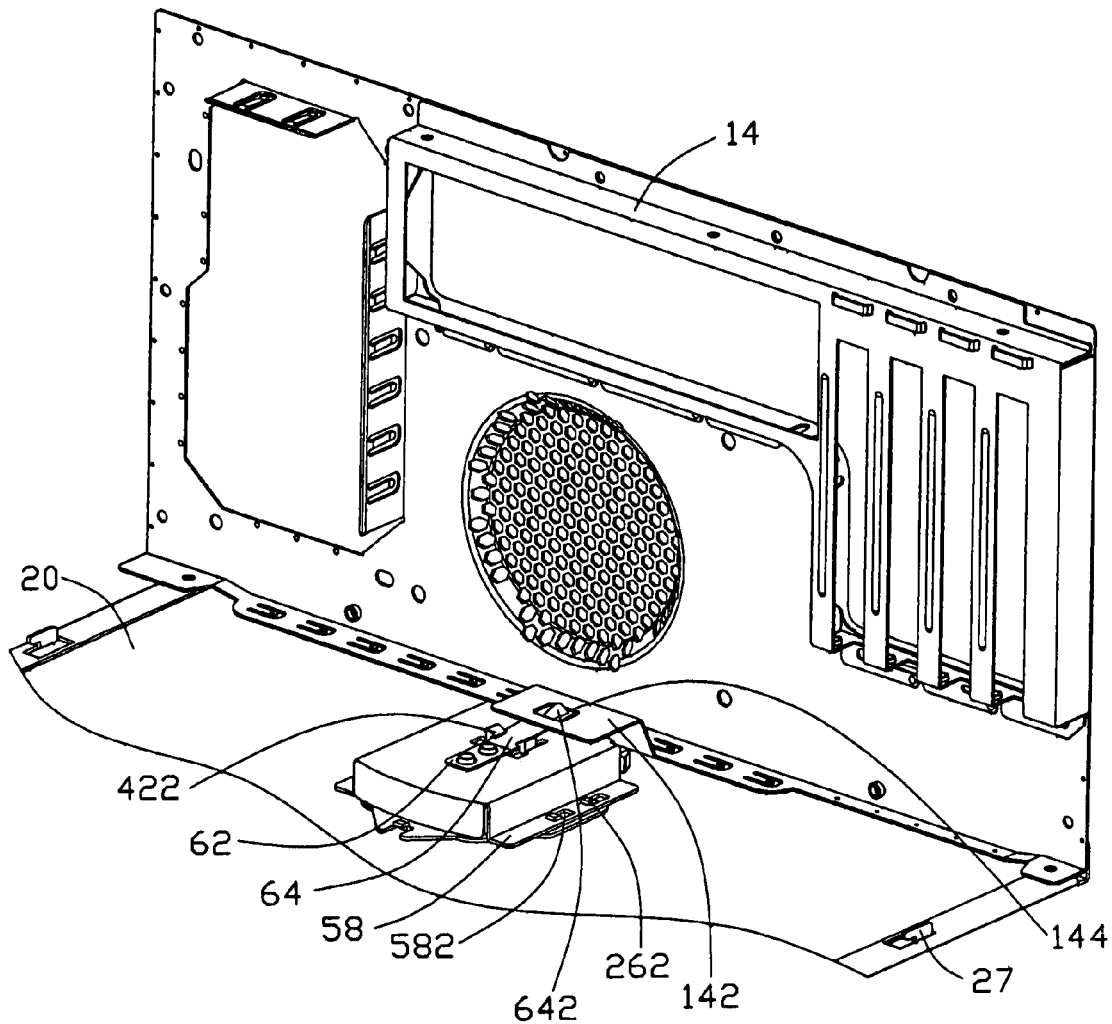
FIG. 5 is an assembled view of FIG. 3, showing the latch device in a locked state.
Figure 6:
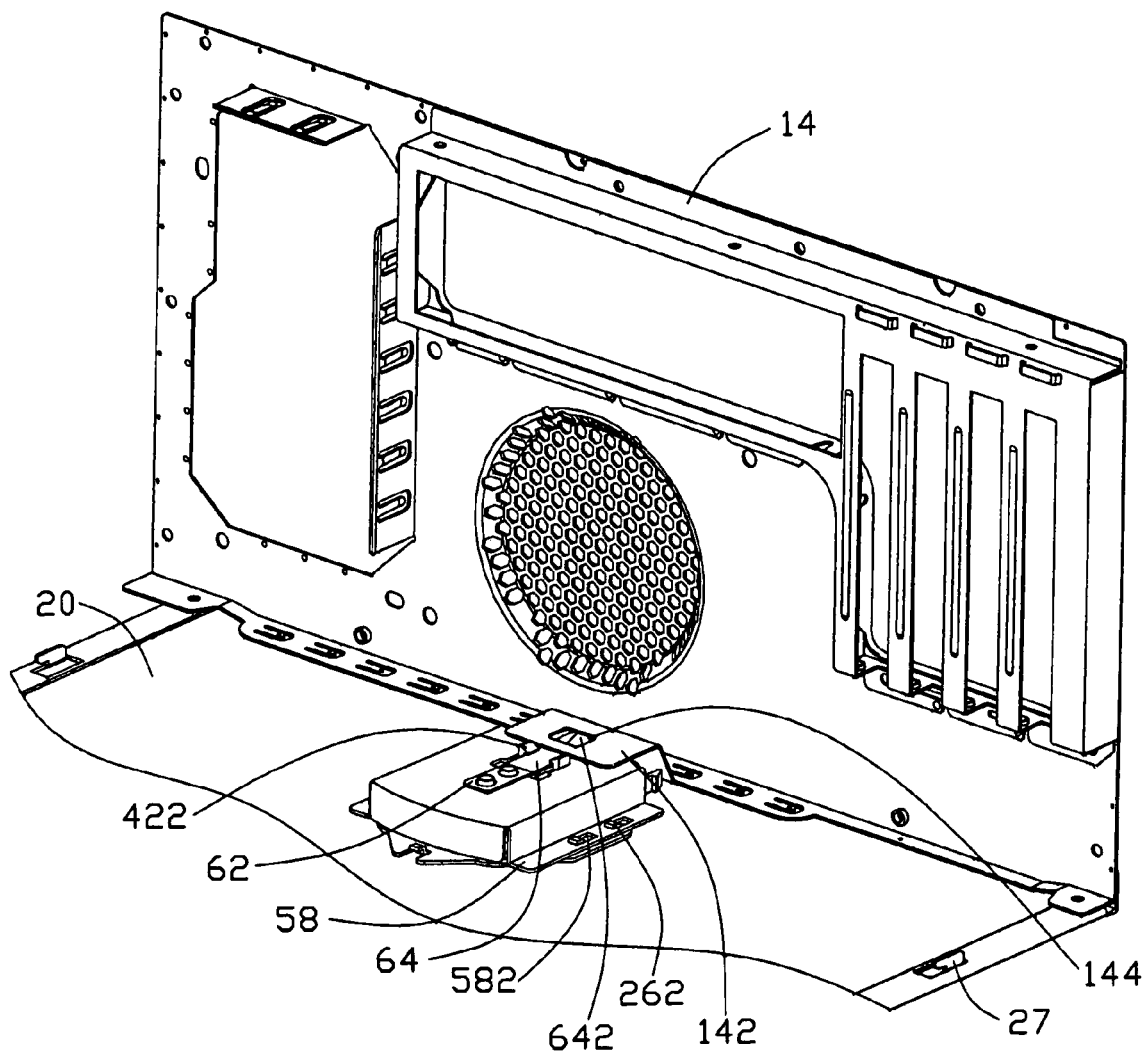
FIG. 6 is similar to FIG. 5, but showing the latch device in an unlocked state.

Referring also to FIGS. 5 and 6, the side panel 20 is then attached to the cage 10, with the catches 27 being received in the slits 16 of the cage 10. The side panel 20 is pushed forwardly, so that the catches 27 engage with the flanges 16*a* in the slits 16. Simultaneously, the projection 642 of the resilient strip 60 rides forwardly along the bracket 142 and snappingly engages in the through hole 144 of bracket 142 of the cage 10. In this locked state, the projection 642 is blocked by the bracket 142 so that the side panel 20 cannot be moved rearward. The side panel 20 is thus secured to the cage 10 by the latch device 30. The coil spring 50 remains slightly compressed, biasing the clasps 442 against the rear ends of the side plates 42. The clamps 422 remain engaged with the front end of the free portion 64 of the resilient strip 60 adjacent the fixing portion 62.

Referring also to FIG. 6, the side panel 20 can be detached from the cage 10 only by releasing the latch device 30 from the cage 10. The concave end wall 46 of the actuator 40 is pushed rearward. The clamps 422 slide rearward and engage with a more rearward part of the free portion 64 of the resilient strip 60. The projection 642 is thus driven upwardly and out from the through hole 144 of the bracket 142. In this unlocked state, the coil spring 50 is more compressed, and the free portion 64 of the resilient strip 60 is resiliently flexed. The side panel 20 is then pushed rearward, with the catches 24 disengaging from the slits 14. The side panel 20 is then easily removed from the cage 10. The pressure on the concave end wall 46 of the actuator 40 is released, and the coil spring 48 decompresses and drives the concave end wall 46 forward to its original position. The clamps 422 thus slide forward and again engage with the front end of the free portion 64 of the resilient strip 60. The free portion 64 of the resilient strip 60 rebounds, and drives the projection 642 inwardly back to its original orientation. The side panel 20 is then ready to be re-attached to the cage 10.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to full extent indicated by the broad general meaning of the terms in which the appended claims are expressed.

The invention claimed is:

1. A computer enclosure comprising:
   a cage comprising a plurality of panels, a bracket formed at one of the panels and defining a through hole therein;
   a side panel attached to the cage; and
   a latch device attached to the side panel, the latch device comprising a cover attached to the side panel, an actuator slidably received in the cover, a resilient strip attached to the cover, and a resilient member;
   the cover comprising a base defining at least one groove, and an end plate extending from the base, the end plate defining an aperture,
   the resilient strip comprising a free portion having a projection at a free end thereof,
   the actuator comprising a shaft extending through the aperture of the end plate, and at least one clamp extending through the groove and slidably engaging with the free portion of the resilient strip, the resilient member being disposed around the shaft between the actuator and the end plate of the cover;
   wherein when the actuator is slid toward the one of the panels of the cage, the at least one clamp presses the free portion of the resilient strip to resiliently deform, thereby causing the projection to withdraw from the through hole of the bracket
   whereby the side panel is releasable from the cage, and when the resilient member drives the actuator to slide away from the one of the panels of the cage, the free portion of the resilient strip rebounds to allow the projection to be extendable into the through hole of the bracket whereby the side panel is securable to the cage.

2. The computer enclosure as described in claim 1, wherein the cage comprises a pair of flanges defining a plurality of slits therein, the side panel comprises a pair of rims forming a plurality of catches, and the catches are engaged in the slits.

3. The computer enclosure as described in claim 1, wherein the side panel defines an opening therein and forms a plurality of hooks around the opening, the cover comprises a pair of side plates and a pair of wings extending from the side plates, each of the side wings defines a plurality of slots, and the cover is attached to the side panel at the opening, with the hooks engaging in the slots.

4. The computer enclosure as described in claim 3, wherein the actuator is integral and comprises a concave end wall, an inmost wall, a pair of side walls, and a pair of clasps extending from the side walls.

5. The computer enclosure as described in claim 4, wherein the at least one clamp extends from the inmost wall, the base of the cover defines at least one L-shaped groove slidably receiving the at least one clamp, the at least one groove extending in a direction generally parallel to the shaft.

6. The computer enclosure as described in claim 1, wherein the base forms a pair of pins thereon, the resilient strip further comprises a fixing portion defining a pair of fixing holes therein, the pins are engaged in the fixing holes.

7. The computer enclosure as described in claim 1, wherein the resilient member is compressed between the actuator and the end plate, when the actuator is slid in the first direction the resilient member is further compressed.

8. The computer enclosure as described in claim 1, wherein the first direction is parallel to the side panel and perpendicular to the rear panel, and when the actuator is slid in the first direction the at least one clamp presses the free portion of the resilient strip to move in a third direction perpendicular to the side panel.

9. A latch device adapted to be attached to a side panel for securing the side panel to a computer cage, comprising:
   a cover adapted to be attached to the side panel, the cover comprising a base and an end plate extending from the base, the base defining a pair of symmetric grooves, the end plate defining an aperture;
   an actuator slidably received in the cover, the actuator comprising a shaft extending through the aperture of the end plate in a first direction and a pair of symmetric clamps;
   a resilient strip attached to the base of the cover, the resilient strip comprising a resiliently deformable free portion having a projection at a free end thereof for engaging with the cage; and
   a resilient member disposed around the shaft between the actuator and the end plate of the cover; wherein
   when the actuator is pushed to slide in the first direction toward the end plate of the cover to compress the resilient member in the first direction, the clamps of the actuator slide in the first direction and press the free portion of the resilient strip to resiliently deform thereby driving the projection to move in a second direction such that the latch device is releasable from the cage: and wherein
   when the actuator is released, the resilient member decompresses to drive the actuator to slide in a third direction opposite to the first direction away from the end plate of the cover, the clamps slide in the third direction and release the free portion of the resilient strip, and the free portion of the resilient strip rebounds to engage the projection with the cage.

10. The latch device as described in claim 9, wherein the cover comprises a pair of side plates and a pair of wings extending from the side plates, and each of the wings defines a plurality of slots.

11. The latch device as described in claim 10, wherein the actuator further comprises a concave end wall, an inmost wall, a pair of side walls, and a pair of clasps extending from the side walls.

12. The latch device as described in claim 11, wherein the clasps are releasably engaged with the side plates of the cover.

13. The latch device as described in claim 9, wherein the base forms a pair of pins thereon, the resilient strip further comprises a fixing portion defining a pair of fixing holes therein, and the pins are engaged in the fixing holes.

14. A computer enclosure comprising:
   a cage defining two side walls connected by a rear wall, each of the side walls defining a first engagement section and the rear wall defining a second engagement section;
   a hood defining a first latching section corresponding to the first engagement section, and a second latching section corresponding to the second engagement section:
   the second latching section including a resilient latch having a projection on a free portion, the free portion resiliently deformable relative to the hood in a vertical direction and releasably engaged with the second engagement section in back-and-forth directions under a condition that the first latching section is latched to the first engagement section in the vertical direction perpendicular to said back-and-forth directions, a cap comprising a base defining at least one groove, and an end plate extending from the base, the end plate defining an aperture, and a slidable actuator comprising a shaft extending through the aperture of the end plate, and at least one clamp extending through the groove and slidably engaging with the free portion of the latch, the actuator located around said resilient latch and being capable of driving the free portion of the resilient latch to resiliently deform in the vertical direction to thereby disengage the latch from the second engagement section so as to allow the hood to leave from the cage in the back-and-forth directions.

15. The computer enclosure as claimed in claim 14, wherein said actuator is equipped with a biasing device to assure the latch in a locked position when assembled.

16. The computer enclosure as claimed in claim 15, wherein the biasing device is configured for driving the actuator to move in the back-and-forth directions.

17. The computer enclosure as claimed in claim 16, wherein the biasing device has a linear shape and extends in the back-and-forth directions.

18. The computer enclosure as claimed in claim 14, wherein the first engagement section comprises at least one slit defined in each side wall, and the first latching section comprises at least one catch formed on the hood for engaging in the at least one slit.

19. The computer enclosure as claimed in claim 14, wherein the second engagement section comprises a bracket formed on the rear wall, and the bracket defines a through hole therein for engaging with the latch.

20. The computer enclosure as claimed in claim 14, wherein the cap is mounted on the hood, the actuator is slidably received in the cap, and the latch has a fixing portion fixed on the cap, the actuator being slidable relative to the latch in the back-and-forth directions to drive the free portion of the resilient latch to resiliently deform in the vertical direction.

* * * * *